(12) United States Patent
Otten et al.

(10) Patent No.: US 11,910,739 B2
(45) Date of Patent: Feb. 27, 2024

(54) PROCESS FOR PREPARING A SEED SUPPORT

(71) Applicant: S+DB B.V., Weert (NL)

(72) Inventors: Gerard Lodewijk Otten, Weert (NL); Franciscus Johannes Lub, Weert (NL)

(73) Assignee: S+DB B.V., Weert (NL)

( * ) Notice: Subject to any disclaimer, the term of this patent is extended or adjusted under 35 U.S.C. 154(b) by 328 days.

(21) Appl. No.: 17/594,011

(22) PCT Filed: Apr. 1, 2020

(86) PCT No.: PCT/EP2020/059291
§ 371 (c)(1),
(2) Date: Sep. 30, 2021

(87) PCT Pub. No.: WO2020/201373
PCT Pub. Date: Oct. 8, 2020

(65) Prior Publication Data
US 2022/0151136 A1    May 19, 2022

(30) Foreign Application Priority Data
Apr. 1, 2019 (EP) .................................... 19166636

(51) Int. Cl.
*A01C 1/04* (2006.01)
(52) U.S. Cl.
CPC .................................... *A01C 1/046* (2013.01)
(58) Field of Classification Search
CPC ........... A01C 1/046; A01C 1/04; A01C 1/042; A01C 1/044
See application file for complete search history.

(56) References Cited

U.S. PATENT DOCUMENTS

| 2,309,702 A | * | 2/1943 | Kirschenbaum | ....... | A01C 1/044 53/553 |
| 2,648,165 A | | 8/1953 | Nestor | | |

(Continued)

FOREIGN PATENT DOCUMENTS

| EP | 0470524 A1 | 2/1992 |
| EP | 3403483 A1 | 11/2018 |

(Continued)

OTHER PUBLICATIONS

Written Opinion and International Search Report in International Application No. PCT/EP2020/059291, 8 pages, dated May 19, 2020.

(Continued)

*Primary Examiner* — Kristen C Hayes
(74) *Attorney, Agent, or Firm* — Heslin Rothenberg Farley & Mesiti P.C.

(57) ABSTRACT

The invention provides a process for the preparation of a seed support that comprises a biodegradable polymer film having a plurality of seeds at least partially embedded therein, the process comprising the steps of
 (a) providing a hydrophobic release liner (18);
 (b) applying a coating of an aqueous dispersion or solution comprising a biodegradable polymer on the hydrophobic release liner (18), wherein the dispersion or solution has a viscosity of from 2000 to 16000 mPa·s and a water content of from 58% to 90% by weight of the coating;
 (c) depositing a plurality of seeds onto the coating so that the seeds become at least partially embedded in the coating;
 (d) drying the coating to give a final water content of 1.5% to 15% by weight and thereby form the biodegradable polymer film; and (Continued)

(e) detaching the hydrophobic release liner from the biodegradable polymer film to give the seed support.

21 Claims, 1 Drawing Sheet

(56) References Cited

U.S. PATENT DOCUMENTS

| | | | |
|---|---|---|---|
| 2,976,646 A | 3/1961 | Hansen et al. | |
| 2011/0302835 A1* | 12/2011 | Ray, III | G09F 3/02 |
| | | | 156/60 |
| 2013/0269248 A1* | 10/2013 | Kennedy | A01G 9/021 |
| | | | 156/249 |
| 2016/0174457 A1* | 6/2016 | Lynch | G06F 16/9554 |
| | | | 47/56 |

FOREIGN PATENT DOCUMENTS

| | | | | |
|---|---|---|---|---|
| JP | 4351545 A | 12/1992 | | |
| WO | WO-03000029 A3 * | 10/2003 | | A01C 1/042 |
| WO | 2018007585 A1 | 1/2018 | | |

OTHER PUBLICATIONS

Extended European Search Report in European Application No. 19166636.1, 6 pages, dated Jun. 3, 2019.

* cited by examiner

PROCESS FOR PREPARING A SEED SUPPORT

CROSS REFERENCE TO RELATED APPLICATIONS

This application is a U.S. National Phase filing under 35 U.S.C. § 371 of International Application PCT/EP2020/059291, filed Apr. 1, 2020, and published as WO 2020/201373A1 on Oct. 8, 2020. PCT/EP2020/059291 claims priority from European application number 19166636.1, filed Apr. 1, 2019. The entire contents of each of these prior applications are hereby incorporated herein by reference.

The invention relates to a process for the preparation of a seed support that comprises a biodegradable polymer film comprising seeds that are at least partially embedded in the biodegradable polymer film.

BACKGROUND OF THE INVENTION

It is known that seed supports can improve germination of seeds and early growth of both sprout and root to make seeds of, for example, grass and vegetables less dependent on the environmental conditions. Known fabrication processes focus on the preparation of seed supports comprising one or more layers or sheets of either paper, woven or nonwoven fabrics, plastic films, mulch mats, or combinations thereof.

U.S. Pat. No. 2,976,646 discloses a seed fabric product and a process for the preparation of the seed fabric product using an upper ply and a lower ply of fluffy carded fibrous webs. On the lower ply seeds are arranged that are trapped and held in the fibrous structure of the web and are further enveloped when the upper ply is deposited thereon. The resultant seed-containing composite carded fibrous web is fed between two squeeze rolls. One of these rolls dips into a bath of aqueous solution of agglutinant sizing agents. Rotation of this roll carrying the sizing solution thoroughly wets and impregnates the fibrous web. The roll pressure is adjusted so that excess sizing solution is squeezed out and the fluffy carded fiber web is compacted, resulting in a damp tissue-like fibrous web. This soft-pressing action is entirely different from the hard-pressing that occurs when a fabric is calendered between hard-surfaced calender rolls and avoids crushing of seeds. The compacted fibrous structure conforms to the seeds and bulges may be formed by large seeds. The damp sized seed-containing tissue web is laid down on an upwardly sloping endless drier belt formed of woven wire and provided with underlying air-suction means. The web is held down flat by the suction and by its wet adhesion to the belt and becomes dry within a few seconds even when dried by room air drawn therethrough. The resultant dry seed fabric product is peeled from the drier belt and wound into a large stock roll. U.S. Pat. No. 2,648,165 discloses a seed carrier and a process for the preparation of the seed carrier in which a continuous web of false backing or "stripper" sheet is prepared by treating a length of paper, cloth, or other suitable material with a surface coating or film of solid material, usually a resin, of such nature that the adhesive to be applied will spread evenly over the surface while wet, but can easily be removed from it when dry. A uniform film of this adhesive having a viscosity of approximately 3500 centipoises (3500 mPa·s) and a thickness which is usually between 0.020 inch and 0.050 inch (508 µm and 1270 µm) is spread upon the false backing. Most of the adhesive compositions specifically exemplified in U.S. Pat. No. 2,648,165 have an initial water content of at least 90% (w/w). Seeds are deposited on to the tacky film in a spaced relation to each other in accordance with the requirements of the species of seed being used. Subsequently, in order to firmly bond the seeds to the sheet and to protect them thereon, a sizing film of adhesive may be applied so that each seed is completely enveloped in adhesive. The sizing film is usually, though not necessarily, of the same kind of adhesive as the base film. The product is then dried or allowed to harden, and, after drying, the seed-bearing film, which is now self-supporting, is removed from the false backing. The obtained seed carrier dissolves in water within a few hours. In one of the examples (FIG. 3) in U.S. Pat. No. 2,648,165, it is disclosed that a backing may first be formed and then coated with adhesive before seeds are applied.

JPH-04351545 discloses a seed support comprising a water-soluble paper coated with a coating of a water-soluble polymer such as polyvinyl alcohol.

EP 0 470 524 (Nisshoku Corporation) discloses a seed support which is formed by spraying a water-soluble adhesive onto a water-soluble non-woven fabric and then depositing seeds onto the adhesive.

Our earlier patent application EP 3 403 483 discloses seed supports formed from self-supporting films of a water-based adhesive such as polyvinyl alcohol. The seed supports of EP 3 403 483 contain between about 85% and 99.5% of a water-based adhesive and about 0.5 to about 15% by weight of water.

THE INVENTION

The present invention provides an improved process for the manufacture of a seed support and in particular an improved process for the manufacture of a seed support of the general type disclosed in our earlier patent application EP 3 403 483.

In a first aspect, the invention provides a process for the preparation of a seed support that comprises a biodegradable polymer film having a plurality of seeds at least partially embedded therein, the process comprising the steps of
  (a) providing a hydrophobic release liner;
  (b) applying a coating of an aqueous dispersion or solution comprising a biodegradable polymer on the hydrophobic release liner, wherein the dispersion or solution has a viscosity of from 4000 to 16000 mPa·s and a water content of from 58% to 90% by weight of the coating;
  (c) depositing a plurality of seeds onto the coating so that the seeds become at least partially embedded in the coating;
  (c-i) partially drying the coating and applying a porous reinforcing layer to the coating when the coating has partially dried and while the coating is still sufficiently tacky for the reinforcing layer to adhere to the coating;
  (d) further drying the coating to give a final water content of 1.5% to 15% by weight and thereby form the biodegradable polymer film; and
  (e) detaching the hydrophobic release liner from the biodegradable polymer film to give the seed support.

In the process of the invention, the biodegradable polymer coating is initially dried to a state whereby it is no longer liquid but is sufficiently tacky to adhere firmly to the reinforcing layer. If not enough water is removed from the biodegradable polymer coating before it is brought into contact with the reinforcing layer, the biodegradable polymer will soak into the reinforcing layer and coat the fibres of the reinforcing layer with the result that, when the seed support has been dried to its final water content, it will typically be somewhat brittle. On the other hand, if the initial drying step is too prolonged, such that the biodegradable polymer coating is no longer tacky, it will only adhere weakly, if at all, to the reinforcing layer. Thus, controlling the initial drying stage is important in ensuring that the final seed support product is not brittle but is sufficiently flexible to allow it to be rolled up, while ensuring also that the biodegradable polymer and the reinforcing layer are firmly bonded together and do not delaminate. It will be appreciated in this respect that because of the presence of the seeds, it is not possible to use high pressures to cause the biodegradable polymer and the reinforcing layer to bond together.

In another aspect, the invention provides a process for the preparation of a seed support that comprises a biodegradable polymer film having a plurality of seeds at least partially embedded therein, the process comprising the steps of
  (a) providing a hydrophobic release liner;
  (b) applying a coating of an aqueous dispersion or solution comprising a biodegradable polymer on the hydrophobic release liner, wherein the dispersion or solution has a viscosity of from 2000 to 16000 mPa·s and a water content of from 30% to 90% by weight of the coating;
  (c) depositing a plurality of seeds onto the coating so that the seeds become at least partially embedded in the coating;
  (d) drying the coating to give a final water content of 1.5% to 15% by weight and thereby form the biodegradable polymer film; and
  (e) detaching the hydrophobic release liner from the biodegradable polymer film to give the seed support.

Further aspects and embodiments of the invention are set out in the accompanying dependent claims and in the following paragraphs. For the avoidance of doubt it is noted that each example, embodiment or preference stated in relation to a given integer of the process as defined above may be combined with each example, embodiment or preference of any other integer of the process as defined above unless the context indicates otherwise.

Unless indicated to the contrary, references to percentages by weight of the components of the seed support exclude the weight of the seeds.

The process according to the invention provides a simple and effective way of preparing a seed support comprising a self-supporting biodegradable polymer film having a plurality of seeds embedded therein, for example a seed support of the type described in our earlier patent application EP 3 403 483. Thus, the process involves the application to a hydrophobic release liner of a coating of an aqueous dispersion or solution comprising a biodegradable polymer, the dispersion or solution having a viscosity of from 2000 to 16000 mPa·s and an initial water content of from 30% to 90% by weight of the coating. The viscosity of the dispersion or solution enables it to spread over the release liner to give a coating of relatively even thickness. Seeds are deposited onto the coating while the coating is still sufficiently soft and moist for the seeds to at least partially sink into the coating so that they become at least partially embedded in the coating. After the seeds have been deposited onto the coating, the coating is dried until a final water content of 1.5% to 15% by weight is achieved, at which point the original viscous liquid coating has been transformed into a cohesive biodegradable polymer film. The hydrophobic release liner can then be stripped (e.g. peeled) from the biodegradable polymer film to leave the seed support.

Prior to the seeds being deposited onto the coating, the coating may be partially dried (for example to a water content of from 45% to 65%) provided that the coating is still sufficiently soft for the seeds to become firmly embedded.

Alternatively, the seeds can be deposited onto the coating before it has dried to any appreciable extent.

The coating is typically dried to its final water content of 1.5% to 15% by weight (for example of from 2% to 5% by weight) by air-drying. The term "air-drying" as used herein includes the case where the coating is dried in a convection or fan-assisted oven, as well as the case where drying is effected by passing a stream of air (e.g. warm or heated air) over the coating.

Preferably, radiative heating is not used to bring about drying to the final water content. However, radiative (e.g. infra-red) drying may be used to bring about partial drying of the coating so that it is sufficiently tacky to adhere to the porous reinforcing layer, with drying by non-radiative means being used to complete the drying process. In one embodiment, the loss of water is effected solely by air-drying;

The coating may be dried by subjecting it to an ambient air temperature (e.g. in an oven) in the range from 20° C. to 100° C. Where a lower temperature is used, drying may conveniently be effected by passing a stream of air over the coating, for example by means of a fan. Where a higher temperature is used, the ambient air may be relatively static.

In one embodiment, the coating is dried by passing the coated liner through a hot air oven wherein the oven itself has no heating elements but instead is connected to a source of heated air.

Although temperatures of 20° C. to 100° C. may be used to dry the coating, more typically the drying temperature is in the range from 35° C. to 90° C. In one embodiment the drying temperature is in the range from 40° C. to 80° C. In another embodiment, the drying temperature is in the range from 55° C. to 85° C.

In one general embodiment of the process, seeds are deposited onto the coated release liner which is then passed through an oven where the drying of the coating to its final water content takes place.

The drying temperature is selected so as to provide controlled and relatively uniform drying of the coating to give a cohesive biodegradable membrane, free from cracks and cavities that might otherwise form if the drying is carried out too quickly and/or at too high a temperature. The temperature will also be selected so that it does not damage the seeds. Different drying temperatures may therefore be used depending on the precise nature of the seeds.

The dispersion or solution comprising the biodegradable polymer has a viscosity ranging from 2000 to 16000 mPa·s when it is initially coated on to the hydrophobic release layer. More typically, however, the dispersion or solution has a viscosity of at least 4000 mPa·s (or at least 5000 mPa·s), for example in the range from 4000 to 12000 mPa·s., or in the range from 5000 to 12000 mPa·s.

In one general embodiment, the dispersion or solution has an initial viscosity in the range from 6000 to 11000 mPa·s.

In another general embodiment, the dispersion or solution has an initial viscosity in the range from 7000 to 10000 mPa·s.

In another general embodiment, the dispersion or solution has a viscosity in the range from 8000 to 10000 mPa·s.

The viscosities of the dispersions and suspensions referred to above are viscosities obtained using the viscosity cup measuring method.

The dispersion or solution comprising the biodegradable polymer may have a water content of from 30% to 89%

(w/w), for example from 50% to 89% (w/w) when it is initially coated on to the hydrophobic release layer. More typically, the dispersion or solution has an initial water content of from 50% to 80% (w/w).

Alternatively, and particularly when a porous reinforcing layer is present, the initial water content may be in the range from 58% to 90% (w/w), for example from 60% to 89% (w/w).

In one embodiment, the dispersion or solution has an initial water content of from 60% to 80% (w/w).

In another embodiment, the dispersion or solution has an initial water content of from 60% to 75% (w/w).

In another embodiment, the dispersion or solution has an initial water content of from 65% to 75% (w/w).

The solution or dispersion of biodegradable polymer is typically coated onto the hydrophobic release liner to give an initial coating thickness in the range from 100-500 µm, more usually from 100-495 µm, more typically in the range 150-400 µm, for example in the range from 150-300 µm or in the range from 200-250 µm.

In one embodiment, the initial coating thickness is in the range from 100-495 µm.

In another general embodiment, the initial coating thickness is in the range from 150-400 µm.

In another general embodiment, the initial coating thickness is in the range from 150-300 µm.

In another general embodiment, the initial coating thickness is in the range from 100-300 µm.

In another general embodiment, the initial coating thickness is in the range from 200-250 µm.

In another general embodiment, the initial coating thickness is in the range from 150-200 µm.

As water is removed from the coating, it shrinks such that when the final water content of 1.5-15% (w/w) (e.g. 2-5% (w/w)) is attained, the thickness of the resulting biodegradable polymer membrane is typically in the range 20-175 µm, more usually 20-100 µm, for example in the range 25-70 µm, and in particular in the range 25-65 µm. The thickness selected for the biodegradable polymer membrane will depend to a large extent on the quantity and type of seeds (see below) to be supported and the presence of any other substances (see below) contained within the membrane.

In particular embodiments, the thickness of the biodegradable polymer membrane can be:
20-100 µm; or
25-70 µm; or
25-65 µm;
40-90 µm;
40-80 µm;
40-70 µm; or
50-80 µm.

The ratio of the thickness of the coating at the initial water content to the thickness of the biodegradable polymer membrane at the final water content can be from about 7:1 to about 2.5:1.

The solution or dispersion of biodegradable polymer may advantageously be coated onto the hydrophobic release liner using a slot die extruder. The hydrophobic release liner is typically moved past a stationary slot die and the dispersion or solution of the biodegradable polymer is extruded though the slot die and onto the release liner. The slot of the slot die is typically arranged transversely with respect to the direction of travel of the hydrophobic release liner. An advantage of using a slot die extruder is that it provides a uniformly thick coating on the liner. The term "slot die extruder" as used herein refers to an applicator device having a slot-shaped (typically transversely oriented) opening through which the solution or dispersion of biodegradable polymer passes as it is applied to the liner. Analogously, the term "slot die" is used herein to refer to a slot-shaped (typically transversely oriented) opening through which the solution or dispersion of biodegradable polymer passes as it is applied to the liner.

In one embodiment, the slot die extruder comprises a moveable barrier wall positioned above the liner and being arranged transversely with respect to a direction of travel of the liner, the barrier wall being movable up or down to provide a gap between the barrier wall and the liner, which gap corresponds to a desired thickness of the coating of biodegradable polymer. In this embodiment, the solution or dispersion of biodegradable polymer is deposited onto the liner on an upstream side of the barrier wall and is carried through the gap by the movement of the liner, the lower edge of the barrier wall serving to limit the thickness of the coating as the liner and solution or dispersion pass though the gap. Thus, in this embodiment, the vertical gap between the liner and the barrier wall constitutes the slot die. By varying the height of the lower edge of the barrier wall above the liner, and hence the size of the gap, the thickness of the coating can be adjusted.

In the foregoing embodiment of the invention, the slot die extruder can take the form of a hopper which is open at a lower end thereof from which the solution or dispersion of biodegradable polymer can be deposited onto the liner, a downstream wall of the hopper being movable up or down and constituting the moveable barrier wall as defined above. The hopper can be of generally rectangular form and thus may comprise the moveable barrier wall, an upstream wall and a pair of side walls linking the upstream wall and barrier wall.

The moveable barrier wall may be referred to herein for convenience as a "knife".

The biodegradable polymer from which the biodegradable polymer film is formed is selected from natural biodegradable polymers, modified natural biodegradable polymers and synthetic biodegradable polymers.

The term biodegradable polymer film as used herein refers to polymer films that lose their structural integrity under conditions encountered during use. For example, the polymer films may be formed from polymers that break down (e.g. by means of hydrolysis or microbial digestion) in the soil, as well as polymers that are water soluble or water dispersible such that membranes formed from the polymers gradually dissolve or disintegrate when in contact with water.

Natural (and modified natural) biodegradable polymers include:
  polysaccharides such as starch (e.g. thermoplastic starch); cellulose and its derivatives; lignocellulosic fibres: chitins and chemically modified forms thereof such as chitosans; and polysaccharide gums;
  polypeptide and proteins such as corn zein; wheat gluten, soya protein; collagen; gelatin; casein and caseinates; and whey proteins;
  lipids such as crosslinked lipids;
  biopolymers produced by natural or genetically modified microorganisms, such as
    microbial polyesters (e.g. polyhydroxyalkanoates, poly-3-hyroxybutyrate. polyhydroxybutyrate-hydroxyvalerate) and polycaprolactones)
  bacterial cellulose;
  polyesters synthesized from bio-derived monomers; for example polylactic acid, polyglycolic acid, and polylactide co-glycolide copolymer;

Synthetic biodegradable polymers include:
aliphatic polyesters such as polycaprolactone; polybutylene succinate; and polybutylene succinate adipate; and polyvinyl alcohol; polyvinyl acetate and mixture and copolymers thereof.

For a review of biodegradable polymers, see Ghanbarzadeh et al; "Biodegradable Polymers", http:/dx.doi.org/10.5772/56230 and see also Khalil et al., *eXPRESS Polymer Letters*, Vol.11, No.4 (2017) 244-265.

Where the biodegradable polymeric membrane is self-supporting, i.e. there is no reinforcing layer, the biodegradable polymer used will be one which has good mechanical strength and in particular good tensile strength, so that it can be stripped from the hydrophobic release layer and wound into a roll, and subsequently used without tearing. Where the biodegradable polymer forms films that do not have the required mechanical strength, a reinforcing layer is typically used. A reinforcing layer may of course be used even when the biodegradable polymeric film alone has good mechanical properties.

Particular biodegradable polymers for use in the process of the present invention are advantageously is selected from polyvinyl alcohol; polyvinyl acetate; starch; and mixtures thereof.

In general embodiments of the invention, the biodegradable polymer comprises (or consists of):
(i) polyvinyl alcohol; or
(ii) polyvinyl acetate; or
(iii) starch or a modified starch; or
(iv) a mixture of polyvinyl alcohol and polyvinyl acetate; or
(v) a mixture of starch (or modified starch) and polyvinyl alcohol; or
(vi) a mixture of starch (or modified starch) and polyvinyl acetate; or
(vii) a mixture of starch (or modified starch), polyvinyl alcohol and polyvinyl acetate.

Polyvinyl alcohol (PVOH) is produced by the hydrolysis of polyvinyl acetate which is formed by polymerization of vinyl acetate monomer. The solubility characteristics of polyvinyl alcohol depend on the extent of hydrolysis of the polyvinyl acetate (PVA). Various grades of polyvinyl alcohol are commercially available having different degrees of hydrolysis and hence different solubilities. Polyvinyl alcohols where there has been greater than 90% hydrolysis of the PVA tend to be less soluble than grades of PVOH where there has been less than 90% (for example 80-88% hydrolysis). In one embodiment the polyvinyl alcohol used in the process of the present invention has been hydrolysed to an extent of 80-88%.

In particular embodiments, the dispersion or solution comprising the biodegradable polymer may be other than one which:
(a) contains methyl sulphate or wherein methyl sulphate has been used in the preparation of the dispersion or solution; and/or
(b) contains styrene-maleic acid copolymer; and/or
(c) contains glycerine.

By way of example, particular biodegradable polymer mixtures that have been used to prepare biodegradable polymeric membranes according to the invention include:
(i) PVOH 90%-PVA 10%;
(ii) starch 70%-PVA 30%;
(iii) starch 50%-PVOH 25%-PVA 25%;
(iv) starch 30%-PVOH 40%-PVA 30%; and
(v) starch 50%-PVA 50%.

Where a reinforcing layer is present, this is typically a porous material. The reinforcing layer should be formed from a material that allows plant shoots or roots to grow through it, depending on which way up the seed support is laid onto an underlying substrate such as soil. The porosity of the material may be an intrinsic property of the material or it may be provided or enhanced by perforation, for example by needling.

The reinforcing material can take the form of, for example, woven or non-woven fabrics, or a perforated film. Examples of woven and non-woven fabrics are those made from natural fibres such as cellulose fibres, lignocellulosic fibres, fibres from plants such as hemp, jute, flax, cotton, coir, abaca, ramie and sisal, wool fibres, nettle fibres and bamboo fibres; and synthetic and semisynthetic fibres such as polylactic acid fibres, glass fibres, modified cellulose fibres (e.g. viscose fibres such as lyocell fibres) and regenerated soy bean fibres. It is preferred that the reinforcing layer is biodegradable and therefore natural or modified natural fibres are preferred. In order to provide a suitable level of porosity, spunlace or needle-punched non-woven materials can be used. One particular non-woven fabric that may be used in the process of the invention is paper. Another particular non-woven fabric for use in the process of the invention is lyocell non-woven fabric.

The reinforcing layer typically has a thickness in the range 25-500 µm, more usually 40-120 µm.

The reinforcing layer itself is typically non-adhesive; i.e. it has no, or substantially no, intrinsic adhesive properties. Instead, it relies upon the adhesiveness of the coating of biodegradable polymer to bond it to the coating.

The reinforcing layer is bonded to the biodegradable polymer after the coating of biodegradable polymer has been partially dried. If the reinforcing layer is brought into contact with the coating too early, it is possible that the solution or dispersion of the biodegradable polymer may be absorbed into the reinforcing layer rather than forming a separate layer. This in turn may lead to the formation of a seed support that is brittle or is subject to the formation of cracks. Thus, the reinforcing layer may be applied to the coating when the water content of the coating has reduced from its initial level to a content of about 40% to about 55% by weight, for example from 45% to 50% (w/w). The point at which the reinforcing layer is applied to the coating is selected such that the coating of biodegradable polymer is firm enough to resist absorption into the reinforcing layer, but it sufficiently tacky to bond to the reinforcing material (which is typically a non-adhesive material).

The bonding of the coating of biodegradable polymer to the reinforcing layer may be assisted by the application of gentle pressure. However, care must be taken to ensure that the pressure is not so high that crushing of the seeds occurs. Gentle pressure can be applied by bringing the reinforcing layer and the coated release together and passing them around a roller such that the release liner is outermost on the roller, in which case the tension in the release liner provides a source of pressure to press the coating of biodegradable polymer and the reinforcing layer together.

The hydrophobic release liner is formed from a polymer that has poorly adherent properties and from which the biodegradable membrane can readily be peeled away after the curing (drying) step of the process has been completed. Thus, the hydrophobic release liner typically has a low surface energy (which can be defined as the critical surface tension).

Examples of polymers from which the hydrophobic release liner can be made include polyesters, polyethylene, polypropylene, amorphous polyethylene terephthalate (PET), fluorinated polyolefins such as polytetrafluorethylene (PTFE), natural or synthetic rubbers, silicones and polymer films having a surface of polyethylene, polypropylene, PTFE or a nitrile rubber.

In one embodiment, the hydrophobic release layer has a surface constituted by a polymer having a critical surface tension of less than 45 mN/m.

In a particular embodiment, the hydrophobic release layer has a surface constituted by a polymer having a critical surface tension of less than 35 mN/m, for example less than 32 mN/m. By way of example, PTFE has a critical surface tension of about 18.5 mN/m, silicone has a critical surface tension of about 24 mN/m, poly(vinylidene fluoride) has a critical surface tension of about 25 mN/m, whereas polyethylene and polypropylene each have critical surface tensions of about 31 mN/m (see "Adhesion and Adhesives: Science and Technology"; Anthony J. Kinloch, New York: Chapman and Hall (1987).)

The hydrophobic release layer is typically provided in the form of a web or belt that is sufficiently flexible to be wound onto and unwound from a roll, and has sufficient tensile strength to enable it to be pulled or otherwise moved along the production line, for example using drive rollers and the like. In a particular embodiment, the hydrophobic release liner is a belt formed from PTFE or a PTFE-coated or silicone-coated polymer such as a coated polyolefin, polyester or polyamide.

During the process of the invention, seeds are deposited onto the coating so that the seeds become at least partially embedded in the coating. The seeds can be deposited on to the coating in a predefined pattern, for example in blocks or rows, or they may be applied in a more random manner. The seeds can be deposited so that each seed is spaced apart from its neighbouring seeds, or the seeds can be deposited in clumps or groups.

In one embodiment, the seeds are deposited on to the coating in a controlled and predefined pattern. In this embodiment, a seed dispensing station may be used which has one or more nozzles or dispensing heads for directing the seeds to predetermined locations on the coating. A seed dispensing station (e.g. an Agricola Italia seed dispenser) may be provided with a plurality of spaced apart nozzles or dispensing heads so as to deposit the seeds in a plurality of rows.

Precision seeding may be used in particular with seed supports bearing vegetable seeds and can carry seeds of a single plant species or cultivar; or mixtures of species and/or cultivars. Precision seeding can be used, for example, in companion planting (e.g. companion planting of carrots and onions).

Where precision planting is not required or essential, for example with grass seeds or wild flower seeds, a more random method of seed dispensing can be used. For example a vibrating or shaking plate or tray may be used to dispense seeds such as grass seeds and wild flower seeds and mixtures thereof The seed support produced using the process of the invention can comprise seeds having an average surface density between about 10 and 200,000 seeds per square metre of the biodegradable polymer film, preferably between about 20 and about 100,000 seeds per square metre, more preferably between about 40 and about 30,000 seeds per square metre, most preferably between about 80 and about 20,000 seeds per square metre of the biodegradable polymer film, or wherein the surface density of the seeds is on average between about 5 and about 60 gram of seeds per square metre of the biodegradable polymer film, preferably between about 10 and about 50 gram of seeds per square metre, more preferably between about 15 and about 40 gram of seeds per square metre of the biodegradable polymer film. Particularly preferred is a seed support according to the invention that comprises seeds having an average surface density between about 50 and 200,000 seeds per square metre of the biodegradable polymer film, or wherein the surface density of the seeds is on average between about 5 and about 60 gram of seeds per square metre of the biodegradable film.

One of the many benefits of the process for producing a seed support according to the invention is that the density of supported seeds can readily be adjusted to suit the requirements of the user of the seed support. Seeds can be at least partially embedded into the biodegradable polymer film of the seed support according to the invention in random fashion, i.e. a random distribution, or the seeds can be arranged in a spaced relation to each other at preselected positions in the biodegradable polymer film, such as a linear distribution.

For example, seeds of a vegetable may be positioned at preselected standard distance from each other in rows in the biodegradable polymer film of the seed support according to the invention, with parallel rows at preselected standard distances from each other. Seeds of flowers can be positioned at equal distances from each other at a surface density of about 100 seeds per square metre. Grass seeds can be applied randomly at substantially equal surface density over the whole surface area of the biodegradable polymer film of the seed support according to the invention. Particularly good results with regard to grass quality and grass leaf soil surface coverage are obtained when grass seeds are randomly and substantially equally distributed on the biodegradable polymer film of the seed support according to the invention at between about 20 gram and about 40 gram of grass seeds per square metre.

A wide variety of different types of seeds can be incorporated into the seed supports during the process of the invention. The seeds will typically be seeds that can be securely embedded in the biodegradable polymer whilst keeping to the parameters of the polymer film (e.g. thickness) disclosed herein. Thus, for example, the seeds will typically be smaller seeds and the seed supports of the invention would not typically be used for large seeds such as beans.

For example, the seeds can be selected from grass seeds; vegetable seeds (such as carrot, cabbage, cauliflower, broccoli, cucumber, marrow and onion seeds); flower seeds; beet seeds; rice seeds; cereal seeds such as rye, wheat and barley seeds and other cereal seeds; oil-bearing plant seeds such as flax seeds, oil-seed rape seeds, lavender seeds, sunflower seeds and hemp seeds; tomato seeds; potato seeds; tree seeds; seeds from a member of the banana family, and any combinations thereof.

Examples of grass seeds that can be advantageously supported by the seed supports produced by the process of the present invention are selected from rye grass, a fescue grass, a turf grass, Bent grass, Kentucky Blue grass, Rough Blue grass, Red Fescue, Annual Rye grass, Perennial Rye grass, Tall Fescue, Thermal Blue, Zoysia grass, Bahia, Bermuda grass, Buffalo grass, Carpet grass, Centipede, St. Augustine grass, Dwarf Rye grass, Turf Rye grass and slender creeping Red Fescue, and any combinations thereof. In one embodiment, the grass seeds are seeds of a rye grass or seeds of a fescue grass.

The seed supports of the invention can contain one or more additives for enhancing the germination or growth of plants from the seeds, or for controlling or eradicating pests. Thus, for example, the seed supports can contain one or more additives selected from plant growth additives; soil-adjustment additives; extender and/or seed protection additives; bio-stimulants such as humic acid, fulvic acid and plant hormones (e.g. gibberellins and auxins); nitrogen containing compounds; inorganic compounds; salt binding agents such as gypsum (calcium sulphate); micro-nutrients (such as zinc, copper, boron, and seaweed extracts); botanicals; chitosan; biopolymers; biological agents such as fungi (e.g. mycorrhizal fungi) or bacteria (e.g. beneficial soil bacteria); organic or synthetic fertilizers; biocontrol agents such as pesticides, herbicides, fungicides, insecticides, wool fibres (for deterring slugs); pH-modifiers such as calcium carbonate, lime and sulphur; UV-stabilisers; water absorbing and retaining materials such as silica, bentonite clays; talcum; pigments and colour dyes.

Such additives will typically be present in amounts corresponding to 0-50% (w/w), more usually 0-25% (w/w), for example 0-10% (w/w), or 0-5% (w/w) of the biodegradable polymer membrane.

It will be appreciated that the additives will be selected so as to be beneficial (and hence non-toxic) to the growth and development of a plant species of interest from the seeds. Thus, for example, if herbicides are included, they will be selective herbicides that do not harm the plant species of interest.

A range of microbiological additives can be incorporated into the compositions of the invention to assist germination and plant establishment. These are typically mycorrhizal fungi. Mycorrhizae are a group of about 400 fungi that form symbiotic relationships with plants. They live in or on the roots, extend their hyphae into the soil and make phosphate, nitrogen other nutrients and water available to the host plant. They extend the effective root area many hundreds of times so plants grow faster, larger and stronger with less fertiliser and water. Other commercially available biological and chemical agents that stimulate plant defences and encourage beneficial symbiotic mycorrhizal associations may also be included.

The buffering and other chemical organic agents provide a means of counteracting the impact of adverse chemical contaminants in the soil or medium, as well as improving germination, and/or aiding and accelerating plant establishment. Thus, for example, lime provides a buffer against low pH, gypsum provides a means of counteracting high salinity, whereas clay minerals such as zeolite, kaolinite, calcium bentonite and montmorillonite counteract high levels of fertiliser or chemical contamination in the soil.

The seed supports produced by the process of the invention may comprise a dye. The dye acts to reduce the amount of light or change the wavelength of light passing through the film to further suppress growth of weeds. By appropriate selection of dyes or other colouring agents, the biodegradable membrane-forming compositions can cure to form dark-coloured membranes that absorb solar radiation more readily, thereby heating the underlying substrate (e.g. soil) and accelerating germination and crop establishment as well as providing for enhanced weed suppression beneath the membrane.

It will be appreciated that the additives should preferably be biodegradable or should be safely incorporated into the substrate (soil) after the crops have been harvested and that the components do not provide any health concerns, which would render the crops grown from the seeds as unsuitable for human consumption.

The additives will typically be added to the solutions or dispersions of the biodegradable polymer before coating onto the hydrophobic release liner.

The solutions or dispersions of biodegradable polymer may be foamed before coating onto the hydrophobic release liner. The foaming may be achieved by means of a foaming machine which introduces air or another gas (such as oxygen or ethylene) into the solution or dispersion before or as it is being coated onto the release liner. Alternatively, or additionally, the solutions or dispersions may contain a foaming agent. The nature of the foaming agent will depend on the nature of the biodegradable polymer, but examples of foaming agents include surfactants and blowing agents. Where the foaming agent is a blowing agent, it may be selected from baking powder (e.g. a mixture of a carbonate or bicarbonate such as sodium bicarbonate with a weak acid such as an acidic citrate or tartrate), azodicarbonamides and isocyanates; see also the blowing agents disclosed in https://www.sciencedirect.com/topics/chemistry/foaming-agent.

The foaming agents can be present in a controlled release (e.g. delayed release) form so that the foaming agent is not immediately activated upon contact with water. Thus, the solutions or dispersions of the biodegradable polymer containing a controlled release foaming agent can be made up and then coated onto the hydrophobic release liner once sufficient foaming agent has been released to bring about foaming.

The seed supports produced by the process of the invention are intended, in use, to protect the seeds during germination and development into seedlings. When laid onto a soil substrate or other substrate, the seed supports absorb water (from the soil if the soil is wet, or from irrigation if the soil is otherwise not wet) and become plasticized so that they conform to the surface of the soil or other substrate. Absorption of water also leads to the biodegradable polymer in the membrane becoming tacky so that the seed support adheres to the soil.

Thus, an advantage of the seed supports of the invention is their "drapability", i.e. their ability in use to soften when contacted with moisture and conform to the contours of the underlying substrate such as soil, and to remain conformed to the contours of the underlying substrate even if they subsequently dry out.

Ultimately, the seed supports produced by the process of the invention will break down and the components absorbed into the soil. The period of time over which this occurs can be varied according to the length of time for which protection of the seeds is required. For plants that are quick to germinate and grow, the seed supports can be formed from biodegradable polymers that begin to break down after a few weeks, for example up to eight weeks (e.g. for baby beet). For slower germinating and growing plants, more extended degradation times (e.g. up to four months) may be desirable. Thus the seed supports should remain relatively intact until germination has taken place and the roots of the resulting seedling are firmly anchored in the underlying substrate (e.g. soil). During growth of the seedling, the seed support also provides weed suppression preventing the establishment and growth of weeds that might otherwise out-compete the seedlings.

The seed supports produced by the process of the invention are sufficiently flexible that they can be rolled up tightly without fracturing and without damage to the seeds or dislodgment of seeds from the support. The rolls of seed support can be formed on cylindrical cores having an outer diameter from, for example, about 2 cm to about 30 cm. The outer diameters of the rolls can vary from, for example, about 50 mm (for small consumer use) to about 1100 mm (e.g. for larger scale horticultural or agricultural use).

The seeds carried by the seed support are firmly attached and this reduces (or avoids) the risk of significant numbers of the adhered seeds coming loose during handling of the seed support, for example during packaging, storage, transporting, and application of the seed support. Typically, the seed supports prepared using the process of the invention should lose less than 5%, more usually less than 1%, and more typically less than 0.1% of the supported seeds in the time from production of the seed support up to the application of the seed support onto a surface of soil for the purpose of obtaining the plants from the supported seeds. It is noted that seeds that are wholly embedded in the biodegradable polymer film of the seed support are even better protected from becoming detached before being germinated at the desired soil surface. In addition, wholly embedded seeds are even better protected from deterioration, e.g. drying out, during warehousing.

DETAILED DESCRIPTION OF AN EMBODIMENT OF THE INVENTION

Figure 1:
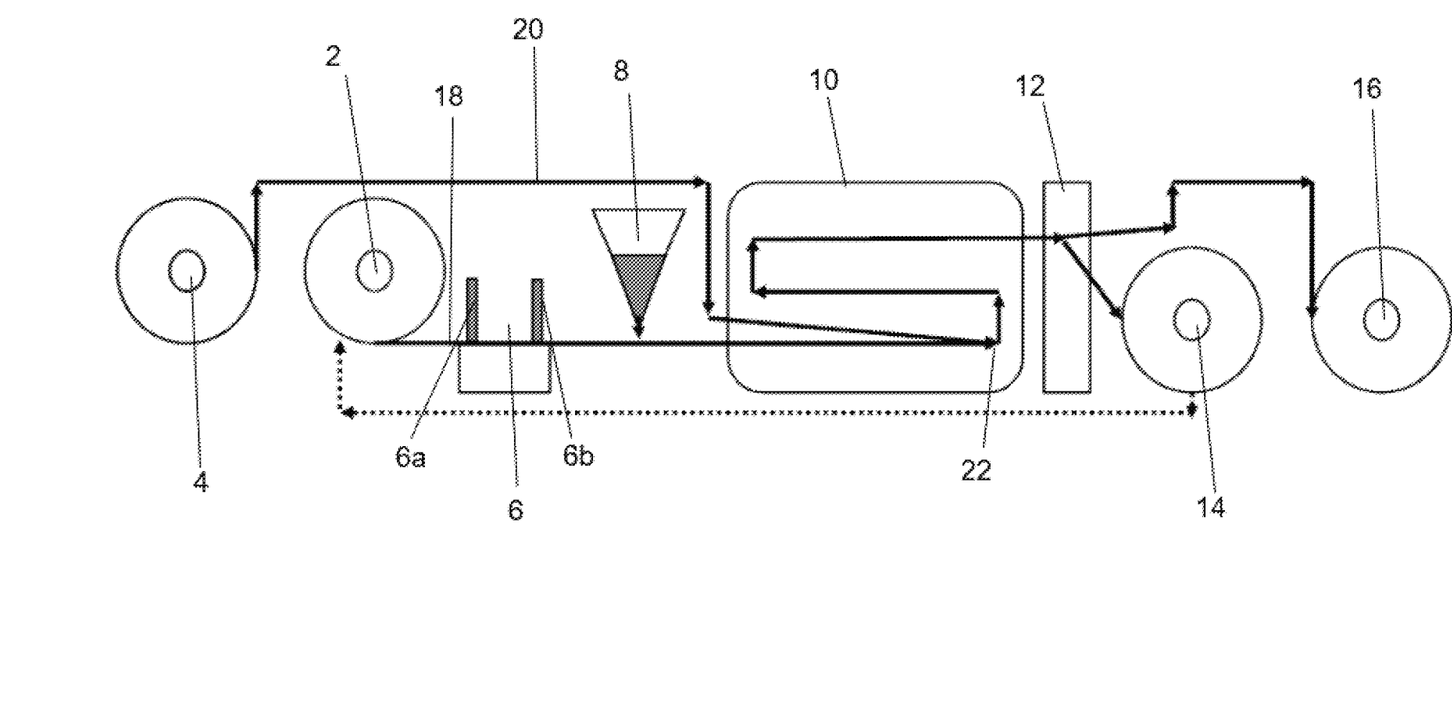
FIG. 1 is a schematic illustration of a production line for the manufacture of a seed support in accordance with one embodiment of the invention.

An embodiment of the process of the invention will now be described in more detail with reference to the schematic view of the production line shown in FIG. 1.

Thus, a production line for carrying a process according to one embodiment of the invention comprises a hydrophobic release liner dispensing station (2), a backing support material dispensing station (4), a coating station (6), a seed dispensing station (8), a drying oven (10), a release liner stripping station (12), a used liner collecting station (14) and a seed support collecting station (16). It will be appreciated that the various guide rollers and driving mechanisms for advancing the release liner, backing support material and finished seed support through the production line have been omitted for clarity but it will be readily apparent to the skilled person how and where such components should be located.

The hydrophobic release liner dispensing station (2) comprises a roll of a hydrophobic release liner belt material which can be, for example, a silicone-coated fibre glass belt or a smooth-surfaced PTFE belt. The hydrophobic release liner material is one which is resistant to the temperatures encountered in the drying oven (10).

The belt (18) of hydrophobic release liner material is unwound from the roll and is advanced to the coating station (6) which comprises a slot die connected to a supply of an aqueous solution or dispersion of a biodegradable polymer material. The said supply can be held within a reservoir or tank directly connected to the slot die, or it can be fed by means of pipework from a remote tank or reservoir. The slot of the slot die is arranged transversely with respect to the direction of travel of the belt (18).

The slot die comprises a pair of transverse walls (6a) and (6b) linked by side walls (not shown) to form a generally rectangular hopper which is open at its lower end so that biodegradable polymer material introduced into the hopper will come into contact with the belt (18). The downstream wall (6b) of the hopper is moveable in a vertical axis and can be moved upwards to create a gap (not shown) between its lower edge and the belt (18). The gap between the lower edge of the wall (6b) and the belt (18) constitutes the slot of the slot die.

As the belt (18) passes through the coating station (6), a solution or dispersion of the biodegradable polymer material is dispensed onto the belt to give an even coating of a desired thickness (e.g. of about 200 µm) which is determined by the size of the gap between the lower edge of the wall (6b) and the belt (18). The thickness of the coating can be varied by moving the wall (6b) up or down to increase or reduce the size of the gap. In this embodiment the coating is a solution of polyvinyl alcohol containing about 65% to about 80% (w/w) of water and having a viscosity of from 5000 to 12000 mPa·s, although it will be appreciated that other biodegradable polymers may be used instead.

The belt (18) carrying the coating of polyvinyl alcohol solution is then advanced to the seed dispensing station (8) where seeds are deposited onto the coated belt so that they become partially embedded in the coating. The seeds are typically deposited onto the coating in a predefined pattern and the seed dispensing station may therefore be provided with one or more seed dispensing nozzles to provide the desired pattern of seed deposition.

After deposition of the seeds, the belt moves into the oven (10) where it is subjected to a temperature in the range from about 40° C. to about 60° C. in order to bring about water removal from the coating. The oven may contain a fan so that the coating is exposed to a stream of warm air to facilitate the drying process. The precise temperature of the oven is selected so as to avoid any damage to the seeds and to ensure that the coating dries as uniformly as possible to maintain a cohesive structure and avoid the formation of cavities and cracks.

While the coating is still tacky, a backing support material is applied to the coating to form a reinforcing layer. The backing support material is dispensed as a web (20) from a roll at the backing support material dispensing station (4). The backing support material is a biodegradable material which can be, for example, a paper or a woven or non-woven natural fibre material such as jute.

The belt (18) and the web (20) of backing support material converge at a laminating station (22) inside the oven. Here, the belt (18) and the web (20) pass around a roller (not shown), the tension in the belt (18) providing a source of pressure which compress the belt (18) and web (20) together so that the reinforcing layer becomes firmly bonded to the coating and covers the seeds. As an alternative to using the tension in the belt to provide a source of pressure to assist bonding of the coating and the web (20), a pair of pinch rollers can be used but the surfaces of the rollers and the compression pressures used must be selected so that firm adhesion between the coating and the web (18) occurs but the seeds are not damaged. The rollers may therefore be formed from a rubber or foam to minimize damage to the seeds.

After the lamination stage, the laminated web and belt are passed through a warmer region of the oven (for example where the air temperature is in the range from 60° C. to 85° C.) where it is dried to its final water content. In order to provide sufficiently drying times of sufficient length (e.g. from 10 to 30 minutes) without needing an oven of excessive length, the laminated web and belt may be guided back and forth several times along a winding through the oven by a series of rollers.

By the time the laminated web (20) and belt (18) emerge from the oven, the coating has cured to form a laminated seed support comprising a biodegradable polymer membrane having a water content of from 1.5% and 15% (w/w) (more usually from 2% to 5% (w/w)) to which the reinforcing layer is firmly bonded. The laminated seed support has a sufficiently high tensile strength and flexibility to enable it to be removed from the belt (18) at the release liner stripping station (12) and then wound to form a roll at the seed support collecting station (16). The used belt (18) of release liner is then wound onto a roll at collecting station (14) and can subsequently be reused or directly recycled (represented schematically by the dotted line in FIG. 1).

Although the drying of the coating to its final water content takes place within the oven, the coating may be partially dried before it enters the oven and/or before the seeds are deposited onto the coating. For example, the coating can be exposed to a stream of air which is either at ambient temperature or is heated, so that some removal of water takes place before the seeds are deposited onto the coating. However, the extent of drying must not be so great that the seeds cannot become embedded in the coating.

In another variation, the backing support material is omitted. It has been found that biodegradable polymers such as those formed from starch, PVOH or PVA or mixtures thereof can form cohesive self-supporting membranes which have sufficient tensile strength and flexibility to enable them to be wound into a roll, without the need for a backing support material.

EXAMPLES

Example 1

The process described above and illustrated in FIG. 1 can be used to prepare a seed support consisting of a biodegradable polymer film 30 μm in thickness formed from polyvinyl alcohol and containing fescue grass seeds in a density corresponding to from about 20 to about 40 grammes of seed per square metre. The seed support of this Example does not have a reinforcing layer.

Example 2

The process described above and illustrated in FIG. 1 can be used to prepare a seed support consisting of a biodegradable polymer film 50 μm in thickness formed from polyvinyl alcohol and containing rye grass seeds in a density corresponding to from about 20 to about 40 grammes of seed per square metre. The seed support of this Example does not have a reinforcing layer.

Example 3

The process described above and illustrated in FIG. 1 can be used to prepare a seed support consisting of a biodegradable polymer film 30 μm in thickness formed from a mixture of 90% (w/w) polyvinyl alcohol and 10% (w/w) polyvinyl acetate and containing fescue grass seeds in a density corresponding to from about 20 to about 40 grammes of seed per square metre. The seed support of this Example does not have a reinforcing layer.

Example 4

The process described above and illustrated in FIG. 1 can be used to prepare a seed support consisting of a biodegradable polymer film 50 μm in thickness formed from a mixture of 90% (w/w) polyvinyl alcohol and 10% (w/w) polyvinyl acetate and containing rye grass seeds in a density corresponding to from about 20 to about 40 grammes of seed per square metre. The seed support of this Example does not have a reinforcing layer.

Example 5

The process described above can be used to prepare a seed support containing grass seeds wherein the biodegradable polymer film is formed from a mixture of starch (70% by weight) and vinyl acetate polymer (30% by weight).

Example 6

The process described above can be used to prepare a seed support containing grass seeds wherein the biodegradable polymer film is formed from a mixture of starch (50% by weight), PVOH (25% by weight) and PVA (25% by weight).

Example 7

The process described above can be used to prepare a seed support containing grass seeds wherein the biodegradable polymer film is formed from a mixture of starch (50% by weight) and PVA (50% by weight).

Example 8

The process described above and illustrated above can be used to prepare seed supports in which the biodegradable polymer films and seed types are as described in Examples 1 to 7 above but where a reinforcing layer of spunlace viscose or cotton or polylactic acid fibre is bonded to the biodegradable polymer film.

An example of a suitable spunlace viscose is available from Jacob Holm (product specification of 9 Jun. 2015-version 00) which is a finely apertured non-woven fabric having a thickness of about 0.6 mm and a weight of about 50 g/m$^2$.

Example 9

Experiments were carried out to determine the moisture content required in a biodegradable polymer film in order to ensure good bonding when the biodegradable polymer film is laminated to the reinforcing layer as described in Example 8.

An aqueous biodegradable polymer mixture corresponding substantially to Example 5 above was prepared with a solids content of 35.8% (w/w) and a water content of 64.2% (w/w). The aqueous polymer mixture was coated onto a release liner to give an initial coating of 1.285 g/m$^2$. Samples of the coated release liner were then passed through an infra-red heating oven at varying speeds in order to bring about different degrees of drying of the polymer mixture. After this initial drying step, the weights of the samples were taken and the weights of the partially dried polymer coating (in g/m$^2$) were recorded. Partially dried samples were then laminated to a reinforcing layer formed from a non-woven fabric having a thickness of about 0.6 mm and a weight of about 50 g/m$^2$, by pressing the two layers together. The laminated products were then fully dried by passing through the infra red oven again after which the net weights of the fully dried polymer coating were determined. The strength of the bond between the non-woven fabric and the biodegradable polymer film in each sample was then tested qualitatively by attempted manual peeling apart of the layers.

The results are shown in Table 1 below.

| Sample No. | Speed through oven - mm/sec | Weight of coating at lamination stage (g/m²) | Weight of coating after complete drying (g/m²) | Calculated moisture content (%) of coating at lamination stage | Strength of bond between polymer film and reinforcing layer |
|---|---|---|---|---|---|
| 1 | 15 | 0.605 | 0.485 | 19.8 | Very poor |
| 2 | 17.5 | 0.645 | 0.505 | 21.7 | Very poor |
| 3 | 20 | 0.915 | 0.495 | 45.9 | Moderate |
| 4 | 22.5 | 0.975 | 0.475 | 51.3 | Good |
| 5 | 25 | 1.055 | 0.505 | 52.1 | Good |
| 6 | 27.5 | 1.105 | 0.455 | 58.8 | Good |
| 7 | 30 | 1.175 | 0.435 | 60 | Good |
| 8 | 32.5 | 1.235 | 0.485 | 61.7 | Good |
| 9 | 35 | 1.265 | 0.465 | 62.2 | Good |
| 10 | No IR heating | 1.285 | 0.485 | 64.2 | Good |

The results show that passing the samples through the oven slowly resulted in a much greater proportion of the moisture being lost. Thus, for samples 1 and 2, the moisture contents after the initial drying step were 19.8% and 21.7% respectively. When lamination to the reinforcing layer was attempted with these samples, the degree of adhesion after complete drying was very poor. The bonding between sample 3 (water content of 45.9% at the lamination stage) and the reinforcing layer was moderate, suggesting that the lower limit for the moisture content at the lamination stage needed to achieve an acceptable degree of bonding is at least 40%.

Samples 4 to 9 having moisture contents at the lamination stage of from 51.3% to 62.2% all showed good bonding, as did sample 10 (moisture content 64.2%) where no initial drying had taken place.

However, at higher moisture levels, there will be a tendency for the polymer mixture to soak into the reinforcing layer resulting in a brittle product after full drying.

On the basis of the above experimental results, it is considered that the moisture content of the polymer mixture coating layer at the lamination stage should be in the range from 40% to 55% by weight in order to give good bonding between the layers without giving rise to potential problems of brittleness resulting from the polymer mixture soaking into the reinforcing layer.

Equivalents

The embodiment described above and illustrated in the accompanying figure is merely illustrative of the invention and is not intended to have any limiting effect. It will readily be apparent that numerous modifications and alterations may be made to the specific embodiment shown without departing from the principles underlying the invention. All such modifications and alterations are intended to be embraced by this application, for example as defined by the claims herein.

For the avoidance of doubt, it is note that any reference numerals in the claims should not be construed as limiting the scope of the invention.

The invention claimed is:

1. A process for the preparation of a seed support that comprises a biodegradable polymer film having a plurality of seeds at least partially embedded therein, the process comprising the steps of
   (a) providing a hydrophobic release liner;
   (b) applying a coating of an aqueous dispersion or solution comprising a biodegradable polymer on the hydrophobic release liner, wherein the dispersion or solution has a viscosity of from 4000 to 16000 mPa·s and a water content of from 58% to 90% by weight of the coating;
   (c) depositing a plurality of seeds onto the coating so that the seeds become at least partially embedded in the coating;
   (c-i) partially drying the coating and applying a porous reinforcing layer to the coating when the coating has partially dried and while the coating is still sufficiently tacky for the reinforcing layer to adhere to the coating;
   (d) further drying the coating to give a final water content of 1.5% to 15% by weight and thereby form the biodegradable polymer film; and
   (e) detaching the hydrophobic release liner from the biodegradable polymer film to give the seed support.

2. A process according to claim 1 wherein the solution or dispersion of biodegradable polymer is coated onto the hydrophobic release liner to give an initial coating thickness in the range from 100-500 μm.

3. A process according to claim 2 wherein the solution or dispersion of biodegradable polymer is coated onto the hydrophobic release liner to give an initial coating thickness in the range from 150-400 μm.

4. A process according to claim 1 wherein, when the final water content of 1.5-15% (w/w) is attained, the thickness of the biodegradable polymer membrane is in the range 20-100 μm.

5. A process according to claim 3 wherein, when the final water content of 1.5-15% (w/w) is attained, the thickness of the biodegradable polymer membrane is in the range 25-70 μm.

6. A process according to claim 1 any one of the preceding claims wherein the solution or dispersion of biodegradable polymer is coated onto the hydrophobic release liner using a slot die extruder.

7. A process according to claim 6 wherein the slot die extruder comprises a moveable barrier wall positioned above the liner and being arranged transversely with respect to a direction of travel of the liner, the barrier wall being movable up or down to provide a gap between the barrier wall and the liner, which gap corresponds to a desired thickness of the coating of biodegradable polymer such that the solution or dispersion of biodegradable polymer is deposited onto the liner on an upstream side of the barrier wall and is carried through the gap by the movement of the liner, the lower edge of the barrier wall serving to limit the thickness of the coating as the liner and solution or dispersion pass though the gap.

8. A process according to claim 1 wherein the biodegradable polymer is selected from polyvinyl alcohol; polyvinyl acetate; starch;
   and mixtures thereof.

9. A process according to claim 8 wherein the biodegradable polymer comprises (or consists of):
   (i) polyvinyl alcohol;
   (ii) polyvinyl acetate;
   (iii) starch or a modified starch;
   (iv) a mixture of polyvinyl alcohol and polyvinyl acetate;
   (v) a mixture of starch and polyvinyl alcohol;
   (vi) a mixture of starch and polyvinyl acetate; or
   (vii) a mixture of starch, polyvinyl alcohol and polyvinyl acetate.

10. A process according to claim 9 wherein the starch is a modified starch.

11. A process according to claim 1 wherein the biodegradable polymer has a water content of from 58% to 89% (w/w) when it is initially coated on to the hydrophobic release layer.

12. A process according to claim 1 wherein the dispersion or solution comprising the biodegradable polymer is other than one which:
(a) contains methyl sulphate or wherein methyl sulphate has been used in the preparation of the dispersion or solution; and/or
(b) contains styrene-maleic acid copolymer; and/or
(c) contains glycerine.

13. A process according to claim 1 wherein the porous reinforcing layer is applied to the coating when the coating has partially dried to a water content in the range from 40% (w/w) to 55% (w/w) and is still sufficiently tacky for the reinforcing layer to adhere to the coating.

14. A process according to claim 13 wherein the porous reinforcing layer is applied to the coating when the coating has partially dried to a water content in the range from 45% to 50% (w/w) and is still sufficiently tacky for the reinforcing layer to adhere to the coating.

15. A process according to claim 1 wherein the reinforcing layer is formed from a woven or non-woven fabric, or a perforated film, or paper.

16. A process according to claim 1 wherein the reinforcing layer has a thickness in the range 25-500 μm.

17. A process according to claim 1 wherein the hydrophobic release layer has a surface constituted by a polymer having a critical surface tension of less than 45 mN/m.

18. A process according to claim 1 wherein the hydrophobic release layer is formed form or has a surface constituted by a polymer selected from polyesters, polyethylene, polypropylene, amorphous polyethylene terephthalate (PET), fluorinated polyolefins, natural or synthetic rubbers, silicones; and polymer films having a surface of polyethylene, polypropylene, PTFE or a nitrile rubber.

19. A process according to claim 1 wherein the hydrophobic release liner is a belt formed from PTFE or a PTFE-coated or silicone-coated polymer.

20. A process according to claim 1 wherein an additive is included in the seed support in an amount of 0-50% by weight, and is selected from plant growth additives; soil-adjustment additives; extender and/or seed protection additives; bio-stimulants; nitrogen containing compounds; inorganic compounds; salt binding agents; micro-nutrients; botanicals; chitosan; biopolymers; biological agents; organic or synthetic fertilizers; biocontrol agents; pH-modifiers; UV-stabilisers; water absorbing and retaining materials; talcum; and pigments.

21. A process according to claim 1 wherein the coating is applied to the hydrophobic release liner as a foam.

* * * * *

UNITED STATES PATENT AND TRADEMARK OFFICE
CERTIFICATE OF CORRECTION

PATENT NO. : 11,910,739 B2
APPLICATION NO. : 17/594011
DATED : February 27, 2024
INVENTOR(S) : Otten et al.

It is certified that error appears in the above-identified patent and that said Letters Patent is hereby corrected as shown below:

In the Claims

Column 18, Line 33: Claim 5, Delete "claim 3" and insert -- claim 4 --

Column 18, Line 37: Claim 6, Delete "any one of the preceding claims"

Column 18, Line 58: Claim 9, Delete "polymer comprises (or consists of):" and insert -- polymer comprises: --

Signed and Sealed this
Third Day of September, 2024

Katherine Kelly Vidal
*Director of the United States Patent and Trademark Office*